A. J. Stephens,
Cultivator.
No. 87,721. Patented Mar. 9, 1869.
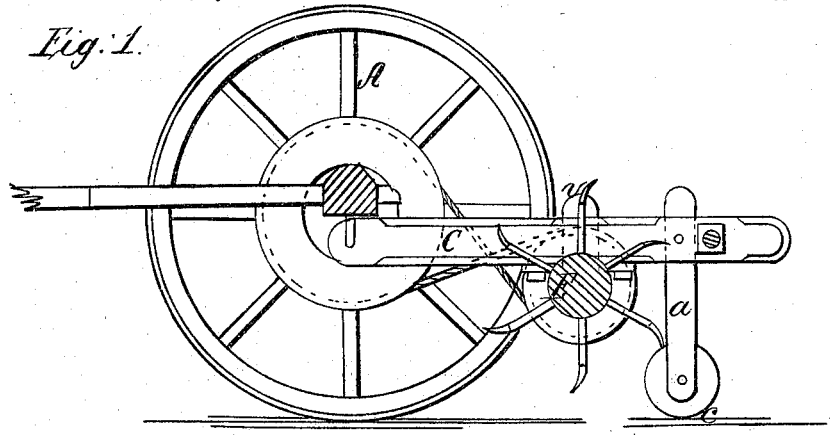
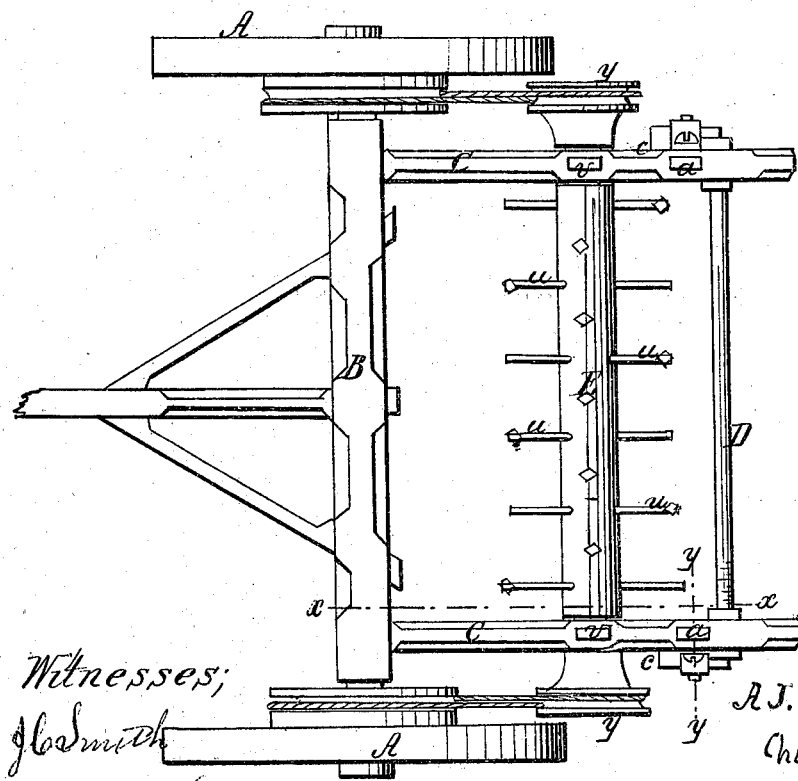
Witnesses;
J. C. Smith
James P. Greves
Inventor,
A. J. Stephens
Chipman Hosmer & Co
Attys

ABRAHAM J. STEPHENS, OF EL DORADO, WISCONSIN.

Letters Patent No. 87,721, dated March 9, 1869.

IMPROVEMENT IN REVOLVING CULTIVATOR.

The Schedule referred to in these Letters Patent and making part of the same.

*To all whom it may concern:*

Be it known that I, ABRAHAM S. STEPHENS, of El Dorado, in the county of Fond du Lac, and State of Wisconsin, have invented a new and valuable Improvement in Revolving Cultivators; and I do hereby declare that the following is a full, clear, and exact description of the construction and operation of the same, reference being had to the annexed drawings, making a part of this specification, and to the letters and figures of reference marked thereon.

Figure 1 of the drawings is a sectional view of my device;

Figure 2 is a plan view; and

Figure 3 is a detail.

My invention relates to that class of cultivators in which the soil is moved and cultivated by means of teeth or plows, operated by a revolving cylinder; and It consists in providing a novel combination of the various parts, the result of which is a more perfect and efficient cultivator than has heretofore been devised of its class.

The letter A, of the drawings, represents the wheels of a sulky-cultivator, constructed with a groove or grooves on the inner sides of their hubs, respectively adapted to receive and actuate one or more cords or bands upon each hub.

The letter B is the axle-tree, and

Letters C are bars extending rearward from the axle, to the lower side of which they are respectively pivoted, and united at their rear ends by the cross-bar D.

This cross-bar D has a screw-thread cut on each of its ends.

Upon these threads, both inside and outside of the bars C, I adjust nuts, as shown on the drawings.

These threads and nuts are used to adjust the position of the rear ends of bars C.

The letters $a$ are adjustable standards, respectively attached to the rear ends of bars C, in the manner represented.

The letters $c$ are casters, attached to the bottoms of standards $a$, as shown, and they are held in place, and their distance from the bars C is regulated by the bent rods $s$, constructed in the form, and operating in the manner represented on fig. 3.

The letter E is a revolving cylinder, adjusted to the lower side of bars C, in the manner shown, the letters $v$ being wedges fitted in mortises in said bars, and serving as bearings for said cylinder, on the upper side thereof.

Each end of cylinder E is provided with a drum, marked $y$, adapted to receive and actuate suitable cords or bands, by which the cylinder E is united with the carriage-wheels, and operated.

The letters $u$ are crooked shovels or teeth, adjusted in the cylinder E, in the manner shown. They are arranged in suitable numbers, and in regular order, and each is bent in the manner represented.

What I claim as my improvement, and desire to secure by Letters Patent, is—

The revolving cylinder E, adjustable standards $a$, casters $c$, bent rods $s$, teeth $u$, wedges $v$, cross-bar D, and drums $y$, combined and operating with the grooved wheel-hubs, and the bands or belts herein mentioned, substantially as specified.

In testimony that I claim the above, I have hereunto subscribed my name, in the presence of two witnesses.

ABRAHAM J. STEPHENS.

Witnesses:
W. T. BIRDSALL,
HENRY F. ROSE.